T. C. SUZZI.
NUT CRACKING MACHINE.
APPLICATION FILED JULY 26, 1910.
1,123,950.
Patented Jan. 5, 1915.
2 SHEETS—SHEET 2.
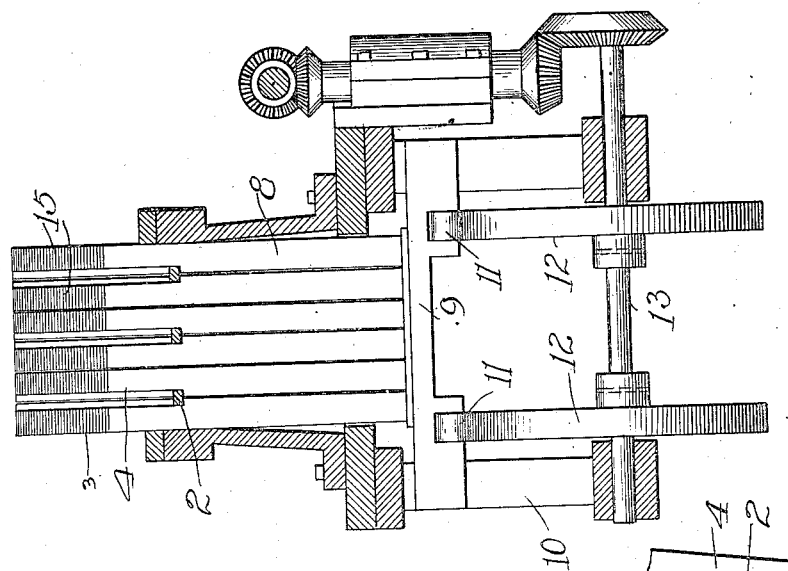
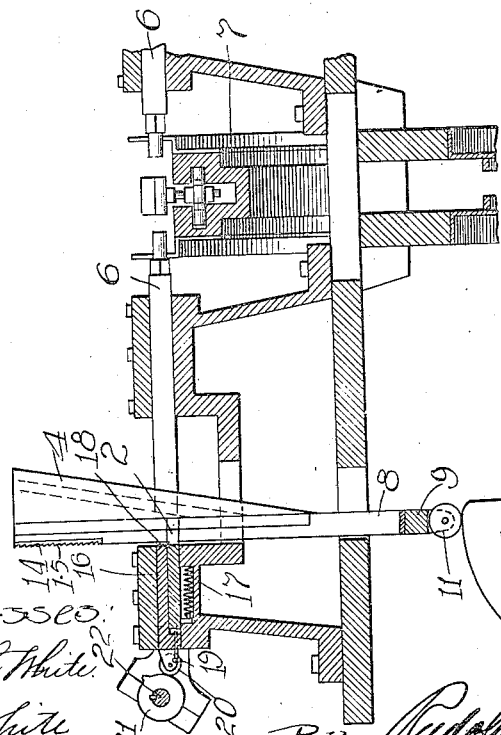
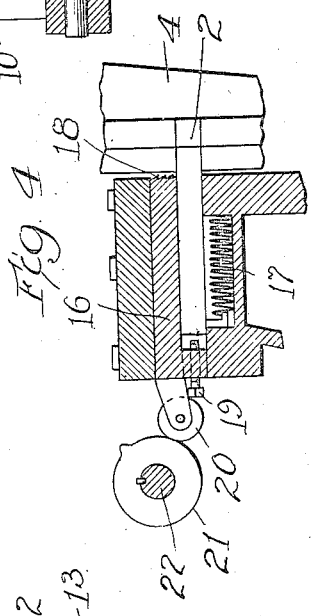

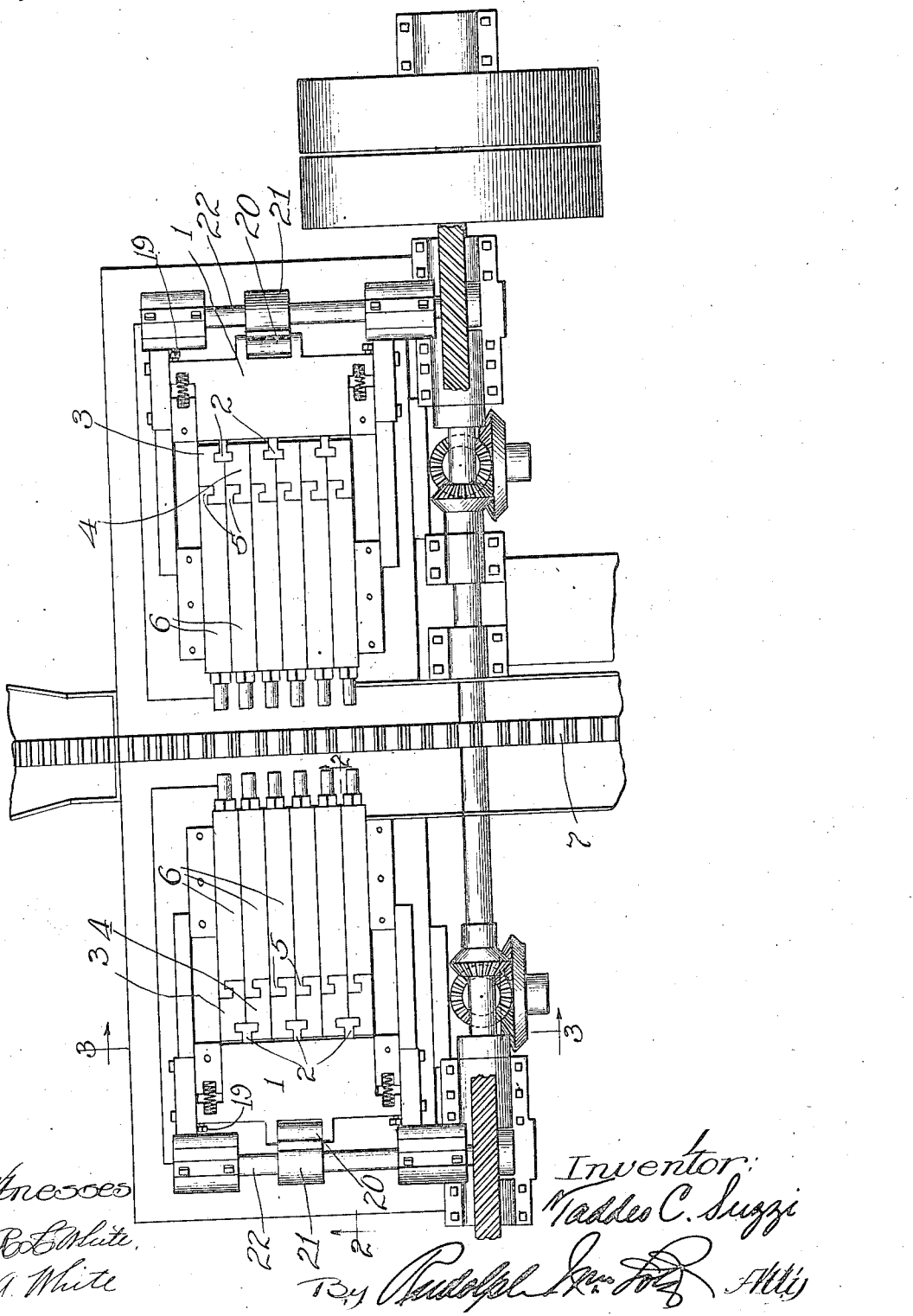

UNITED STATES PATENT OFFICE.

TADDEO C. SUZZI, OF CHICAGO, ILLINOIS, ASSIGNOR TO GINOCCHIO, COSTA & CO., OF CHICAGO, ILLINOIS, A FIRM CONSISTING OF LOUIS GINOCCHIO, PETER COSTA, AND ANTON M. MEYER.

NUT-CRACKING MACHINE.

1,123,950. Specification of Letters Patent. Patented Jan. 5, 1915.

Application filed July 26, 1910. Serial No. 573,954.

*To all whom it may concern:*

Be it known that I, TADDEO C. SUZZI, citizen of the United States, residing at Chicago, in the county of Cook and State of Illinois, have invented certain new and useful Improvements in Nut-Cracking Machines; and I do hereby declare the following to be a full, clear, and exact description of the invention, such as will enable others skilled in the art to which it appertains to make and use the same.

This invention relates to a novel construction in a nut cracking machine, and has for its particular object to provide means whereby the devices imparting primary engaging movement to the cracking plungers relatively to the nuts to be cracked are held against retraction during the cracking operation, and consists in the features of construction and combinations of parts hereinafter fully described and claimed.

In the accompanying drawings illustrating this invention: Figure —1— is a plan view of a nut cracking machine constructed in accordance with my invention, certain parts being removed to expose to view the operating mechanism. Fig. —2— is a fragmentary vertical longitudinal section of the same on the line 2—2 of Fig. —1—. Fig. —3— is a vertical transverse section of the same on the line 3—3 of Fig. —1—. Fig. —4— is a fragmentary detail vertical longitudinal section showing the particular means employed for preventing retraction of the wedges employed.

The present invention relates exclusively to the means employed for preventing retraction of the devices which impart primary indeterminate movement to the cracking plungers of a nut cracking machine to primarily engage the same with an interposed nut to be cracked so as to insure a positive cracking movement of the plungers. The invention is applicable to all nut cracking machines employing the particular plunger actuating means, herein illustrated and described, or equivalents thereof, it being understood, of course, that the invention may be modified to coact with the different mechanisms which may be employed in different machines for accomplishing the purpose without departing from the spirit of the invention.

As the invention does not relate to the nut cracking machine as an entity, I have illustrated in the accompanying drawings only so much of a nut cracking machine as will enable my invention to be readily understood and carried out.

In nut cracking machines at present in use the nuts are interposed between opposed pairs of cracking plungers, being carried to this position by means of a carrier of suitable construction, and after cracking, being transported from this position and delivered into a suitable receptacle. Owing to the fact that all nuts to be cracked vary in length and diameter it is necessary, in order to successfully crack the same, to primarily impart to each pair of the cracking plungers an indeterminate relative movement toward each other, such movement being limited by engagement of said plungers with opposite ends of the nut to be cracked. This primary indeterminate relative movement of the plungers is followed by a positive limited movement in the same direction during which the ends of the nut are forced toward each other, thereby fracturing the shell usually over its entire circumference. After this secondary or cracking movement of the plungers has been completed the same are retracted to their first positions preparatory to a second operation thereof.

The means for imparting primary forward movement of the plungers into engaging relation to the nut to be cracked previously to imparting the cracking movement thereto vary in different machines, and I have, therefore, illustrated my invention as applied particularly to a machine in which the primary forward movement of the plungers is effected by means of wedges actuated by gravity in one direction. This means of imparting primary movement is possibly the simplest of any employed in machines of this character and at the same time affords the greatest difficulty in the prevention of retraction of the plungers or rather failure of forward movement of the same to effect cracking of the nut, this being due to the fact that the resistance to the final cracking movement of the plunger is often sufficient to overcome the pressure exerted by the wedge and thus causes the latter to be lifted during the final movement of the carriage in which said wedges are mounted, the latter being thus incapable of transmitting such movement of the carriage to the cracking plungers, the latter, therefore, failing in the performance of their intended function.

In the accompanying drawings I have illustrated so much of the frame of a nut cracking machine as is deemed necessary, parts of same being omitted. On the frame I provide at opposite ends carriages 1, each of which is provided at one end with a plurality of T-shaped projections 2, the flanges at the free ends of which enter and engage vertical guide grooves in wedges 3 and 4, each of which is vertically slidable relatively to said carriage and said guides. The rear face of each of said wedges is vertical and parallel with the guide groove therein in which a flange of said T-shaped projection is engaged. The other or forward face of each of said wedges is inclined and parallel with said inclined face and is provided with a guide groove in which the L-shaped projection 5 on the nut cracking plunger 6 is received and engaged so that, as the wedge is moved vertically relatively to the carriage and to said cracking plunger, the latter will be moved longitudinally thereby. Said plungers 6 are confined in suitable guides to prevent movement thereof either laterally or vertically. The said plungers 6 are arranged in pairs on opposite sides of a suitable carrier 7, shown in plan in Fig. 1, the latter being provided at regular intervals with pockets in which the nuts are received and carried into the path of opposed pairs of said plungers 6. The said carriages 1 and the inclined faces of said wedges 3 and 4 are necessarily also opposed to each other. At their lower ends said wedges 3 and 4 are equipped with shanks 8 which extend into the path of a vertically reciprocating plunger 9 suitably mounted in vertical guides 10 in the frame of the machine and which are equipped at or near their ends with anti-friction rollers 11 adapted to travel upon the peripheries of cams 12 mounted upon a shaft 13 on the frame of the machine. The said peripheries of said cams 12 are spiral and serve to gradually raise said plungers 9 from a point near the axis of rotation thereof to the point of greatest radius of the same and as this point passes said guides 10 suddenly releases said plunger and permits the same to drop by gravity upon that portion of the periphery nearest approaching the axis of rotation. The distance of the drop of the plungers 9 is greater than the maximum downward movement of the wedges 3 and 4 necessary to throw the plungers 6 engaged thereby the requisite distance forward to engage an interposed nut so that said wedges remain suspended from the said plungers 6 and carriages 1 during the cracking operation and during the upward movement of the plunger 9 said wedges are successively engaged by the latter at their lower ends in accordance with their respective relative elevations and are then simultaneously returned to the positions shown in Fig. 2 at which time the plungers 6 are retracted to the outermost limits of their movement.

The foregoing arrangement is not novel in the art and constitutes no part of my invention. The difficulty with machines thus operated has been that after the wedges have dropped and have thus thrown the plungers 6 into engaging relation to the nut to be cracked and the carriage 1 is given its forward movement by means of suitable actuating means, the movement of the carriage was not transmitted positively to the plungers through the wedges and, therefore, in many instances, particularly if the interposed nut happened to be of a relatively hard shell variety, it was not cracked. That is to say, the resistance offered by the nut was sufficient to cause the wedge to be raised during the forward movement of the carriage while the plunger remained stationary. The said forward movement of the carriage is, of course, very limited and usually is not in excess of one-sixteenth or three-thirty-seconds of an inch. In order to insure proper operation of the wedges the latter had to be maintained very well lubricated over the entire surfaces thereof and this necessarily served to overcome the friction to the extent necessary to enable the same to be easily raised by means of forces acting horizontally in opposite directions against the relatively inclined faces thereof. To overcome this difficulty I provide on each wedge a short section 14 of ratchet rack, the teeth 15 of which face upwardly and project from the rear face of the wedge. As said wedge drops the said ratchet rack is brought opposite or in alinement with the carriage 1. In the latter I provide a longitudinally reciprocal plunger 16 normally held by means of springs 17 at the rearward limit of its movement relatively to said carriage 1 and which is provided on its forward edge with ratchet teeth 18 facing downwardly and adapted to engage the ratchet teeth of the rack 14 to prevent upward movement of the wedge relatively to the carriage during the forward movement of the latter. The movement of the said plunger 16 is limited by means of set screws 19, or the like, which engage the rear end portion of the carriage during the forward movement of said plunger 16 and thus transmit the movement of the latter to said carriage. Said plunger 16 carries an anti-friction roller 20 at its rear end which is engaged by a cam 21 on the shaft 22 and is moved forward at regular intervals by the latter, the said intervals of forward movement of said plunger 16 following the completion of the drop of the plunger 9 and wedges 3 and 4. Thus the extent of forward movement of the plunger 16 is greater than the forward movement of the carriage 1 to effect cracking of the engaged nuts, as during the first part of the forward movement of said plunger 16 the ratchet teeth at the forward end of the same are thrown into engagement with the ratchet racks 14 of the wedges, and simultaneously, the set screws 19, or other means for limiting the relative movement in one direction of said plunger and the carriage 1, engage the latter and transmit movement thereto. As said wedges are incapable of movement relatively to the carriage 1 longitudinally thereof the forward movement of the latter will be transmitted to said wedges and through the latter to said cracking plungers 6 as will be obvious and as said wedges are held by the plunger 16 against upward movement relatively to the carriage during the forward movement of the latter the cracking movement imparted to the plungers 6 becomes positive and unfailing. Thus the cracking of every nut interposed between opposing pairs of said cracking plunger 6 is assured.

I claim as my invention:

1. In a nut cracking machine, the combination with a plurality of cracking plungers for imparting cracking movement thereto, and cams for actuating said last-named plungers, of wedges interposed between the cracking plungers and said cam-actuated plungers for imparting primary relative movement to said plungers to throw the first-named plungers into engagement with nuts to be cracked preparatory to actuating said cam-actuated plungers, means controlling the movement of said wedges and means actuated by said cams and adapted to engage said wedges to hold them against retraction after the same have moved to a position to throw the cracking plungers into engagement with nuts to be cracked prior to the actuation of said cam-actuated plungers.

2. In a nut cracking machine, the combination with cracking plungers and wedges actuated by gravity in one direction for moving said cracking plungers into engagement with nuts to be cracked, of locking bars adapted to engage said wedges to prevent them from rising after having actuated said cracking plungers, cams for actuating said locking bars to throw the same into engagement with said wedges, and plungers engaged with said wedges and adapted when said locking bars have engaged said wedges to be moved thereby to impart movement to said wedges and said cracking plungers in a direction to crack the engaged nuts.

3. A nut cracking machine comprising, in combination, cracking plungers with means for actuating them to impress cracking pressure on the nuts, gravity actuated means adapted to set or adjust the plungers to nuts of different lengths, and ratchet means on the gravity actuated means and parts, relatively to which the gravity actuated means are movable, for locking the gravity actuated means from retraction when the plungers are actuated to crack the nuts.

4. A nut cracking machine comprising, in combination, cracking plungers with means for actuating them to impress cracking pressure on the nuts, gravity actuated rising and falling wedges adapted to set or adjust the plungers to nuts of different lengths and ratchet means on the wedges and parts, relatively to which the wedges are movable, for locking the wedges from retraction when the plungers are actuated to crack the nuts, and means whereby the ratchet means are separated to clear each other when the cracking pressure is released to permit said wedges to rise.

In testimony whereof I have signed my name in presence of two subscribing witnesses.

TADDEO C. SUZZI

Witnesses:
RUDOLPH WM. LOTZ,
M. M. BOYLE.